US009850603B2

(12) United States Patent
Newkirk et al.

(10) Patent No.: US 9,850,603 B2
(45) Date of Patent: Dec. 26, 2017

(54) NONWOVEN FABRIC, A LAMINATED FABRIC, A NONWOVEN FABRIC PRODUCT, A MULTICOMPONENT FIBRE, A WEB, AND A METHOD OF PRODUCING THE NONWOVEN FABRIC

(75) Inventors: David Dudley Newkirk, Greer, SC (US); Juergen Friedrich Rudolph, Moerstadt (DE); Helmut Hartl, Braunschweig (DE)

(73) Assignees: Fitesa Simpsonville, Inc., Simpsonville, SC (US); Fitesa Germany GmbH, Peine (DE)

( * ) Notice: Subject to any disclaimer, the term of this patent is extended or adjusted under 35 U.S.C. 154(b) by 913 days.

(21) Appl. No.: 13/880,251

(22) PCT Filed: Oct. 19, 2011

(86) PCT No.: PCT/US2011/056930
§ 371 (c)(1),
(2), (4) Date: Dec. 6, 2013

(87) PCT Pub. No.: WO2012/054636
PCT Pub. Date: Apr. 26, 2012

(65) Prior Publication Data
US 2014/0087618 A1    Mar. 27, 2014

Related U.S. Application Data

(60) Provisional application No. 61/394,880, filed on Oct. 20, 2010.

(51) Int. Cl.
*D01D 5/08*    (2006.01)
*D04H 1/42*    (2012.01)
(Continued)

(52) U.S. Cl.
CPC .............. *D04H 1/42* (2013.01); *B32B 5/022* (2013.01); *B32B 5/26* (2013.01); *D01D 5/08* (2013.01);
(Continued)

(58) Field of Classification Search
CPC ........ B32B 35/022; B32B 5/26; D10D 10/00; D01D 5/08; D01F 6/46; D01F 8/06;
(Continued)

(56) References Cited

U.S. PATENT DOCUMENTS 3,723,609 A * 3/1973 Mansmann ............... D01F 9/16
264/211.11
6,172,204 B1 * 1/2001 Sarkanen ................. C07G 1/00
106/164.01
(Continued)

OTHER PUBLICATIONS

Compere, A. L., Griffith, W. L., Leitten Jr, C. F., & Petrovan, S. (May 2004). Improving the fundamental properties of lignin-based carbon fiber for transportation applications. In Proceedings of the 36th International SAMPE Technical Conference (pp. 2246-2254).*

*Primary Examiner* — Arti Singh-Pandey
(74) *Attorney, Agent, or Firm* — Alston & Bird LLP

(57) ABSTRACT

A nonwoven fabric comprising a meltspun fiber of a lignin compound. Also claimed a laminated fabric comprising the nonwoven fabric, a nonwoven fabric product comprising the nonwoven fabric, a structured multicomponent fiber comprising a lignin compound, a web comprising a meltspun fiber of a lignin compound and a method of producing a nonwoven fabric by forming a web of meltspun fiber comprising a lignin compound and bonding at least a portion of the fiber in the web to form the nonwoven fabric.

20 Claims, 1 Drawing Sheet

(51) Int. Cl.
*D01F 1/10* (2006.01)
*D01F 6/46* (2006.01)
*D01F 8/06* (2006.01)
*D01F 8/18* (2006.01)
*D01F 9/00* (2006.01)
*B32B 5/02* (2006.01)
*B32B 5/26* (2006.01)
*D01D 10/00* (2006.01)
*D04H 1/56* (2006.01)
*D04H 3/16* (2006.01)
*D04H 1/4266* (2012.01)
*D04H 3/013* (2012.01)
*D04H 3/015* (2012.01)

(52) U.S. Cl.
CPC ............... *D01D 10/00* (2013.01); *D01F 1/10* (2013.01); *D01F 6/46* (2013.01); *D01F 8/06* (2013.01); *D01F 8/18* (2013.01); *D01F 9/00* (2013.01); *D04H 1/4266* (2013.01); *D04H 1/56* (2013.01); *D04H 3/013* (2013.01); *D04H 3/015* (2013.01); *D04H 3/16* (2013.01); *Y10T 428/2929* (2015.01); *Y10T 442/60* (2015.04); *Y10T 442/608* (2015.04); *Y10T 442/609* (2015.04); *Y10T 442/641* (2015.04); *Y10T 442/659* (2015.04); *Y10T 442/66* (2015.04)

(58) Field of Classification Search
CPC .... D01F 8/18; D01F 9/00; D04H 1/42; D04H 1/56; D04H 3/16; Y10T 428/2929; Y10T 442/60; Y10T 442/608; Y10T 442/609; Y10T 442/641; Y10T 442/659; Y10T 442/66
See application file for complete search history.

(56) References Cited

U.S. PATENT DOCUMENTS

| | | |
|---|---|---|
| 6,765,028 B2 | 7/2004 | Kadla et al. |
| 7,678,358 B2 | 3/2010 | Eckert et al. |
| 7,794,824 B2 | 9/2010 | Eckert et al. |
| 2003/0212157 A1 | 11/2003 | Kadla et al. |
| 2005/0129897 A1* | 6/2005 | Zhou ..................... A47K 7/02 428/43 |
| 2005/0136772 A1* | 6/2005 | Chen ..................... A47L 13/16 442/381 |
| 2007/0142225 A1 | 6/2007 | Baker |
| 2008/0318043 A1* | 12/2008 | Eckert ..................... D01F 9/17 428/401 |
| 2010/0202957 A1 | 8/2010 | Baker |
| 2013/0084455 A1* | 4/2013 | Naskar ..................... D01D 5/24 428/367 |

* cited by examiner

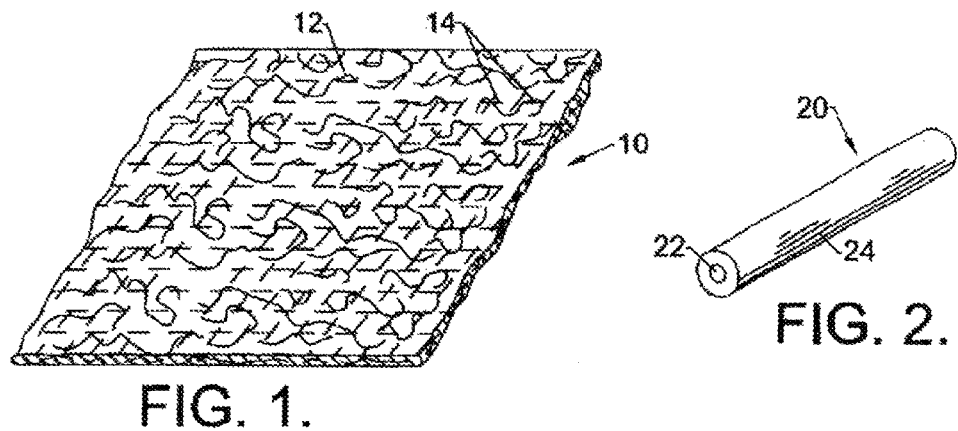
FIG. 1.
FIG. 2.
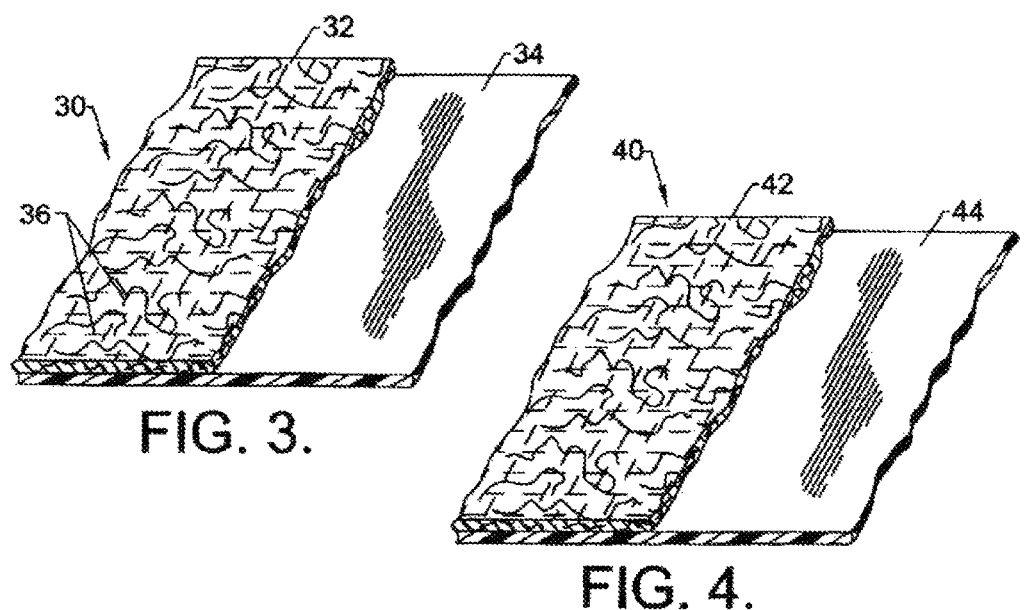
FIG. 3.
FIG. 4.
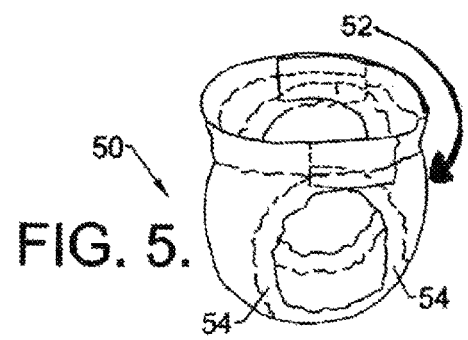
FIG. 5.

NONWOVEN FABRIC, A LAMINATED FABRIC, A NONWOVEN FABRIC PRODUCT, A MULTICOMPONENT FIBRE, A WEB, AND A METHOD OF PRODUCING THE NONWOVEN FABRIC

FIELD

The invention relates to a nonwoven fabric, a laminated fabric and a nonwoven fabric product comprising the nonwoven fabric, a multicomponent fibre useful for producing the nonwoven fabric, and a method of producing the nonwoven fabric.

BACKGROUND

Nonwoven fabrics are customarily used in the production of disposable and non-disposable products, for example diapers, dryer sheets, training pants, incontinence briefs, and feminine hygiene products. Such nonwoven fabrics comprise to a large extend materials such as polyolefins, polyesters, poly(lactic acid)s, rayon or cotton. To the extent that these materials are based on fossil feedstock, for example natural gas and oil, their use in this application contributes to the problem of the green house gasses. To the extent that these materials are based on agricultural products, for example cotton and poly(lactic acid) derived from corn, their use in this application diverts scarce agricultural resources away from food production. Thus, there is a need for a material for use in nonwoven fabrics which does not meet these shortcomings and which improves the sustainable content of disposable and non-disposable products.

SUMMARY

The present invention provides a nonwoven fabric, which nonwoven fabric comprises a fibre comprising a lignin compound. In a preferred embodiment, the invention provides a nonwoven fabric, which nonwoven fabric comprises a fibre comprising a lignin compound and a polymer selected from polyolefins and polyesters.

The invention also provides a laminated fabric comprising the nonwoven fabric of this invention.

The invention also provides a nonwoven fabric product comprising a nonwoven fabric of this invention.

The invention also provides a structured multicomponent fibre comprising a lignin compound and a polymer or comprising two or more lignin compounds.

The invention also provides a web, which web comprises a fibre comprising a lignin compound.

The invention also provides a method of producing a nonwoven fabric, which method comprises forming a web of fibre comprising a lignin compound and bonding at least a portion of the fibre in the web to form the nonwoven fabric.

Lignin is a major component of wood. One step in the manufacture of paper pulp from wood involves the separation of lignin from cellulose using, for example, soda, sulfite or Kraft processes. The lignin is a byproduct and needs to be discarded. To a large extent, lignin is combusted. The use of lignin as a base material for nonwoven fabric, in accordance with this invention, improves the sustainable content of disposable and non-disposable products.

BRIEF DESCRIPTION OF THE DRAWINGS

FIG. 1 is a schematic perspective view of a nonwoven fabric of this invention.

FIG. 2 is a schematic perspective view of a multicomponent fibre useful for making a nonwoven fabric of this invention.

FIG. 3 and FIG. 4 are schematic perspective views of laminated fabrics of this invention.

FIG. 5 is a perspective view of a nonwoven fabric product of this invention.

DETAILED DESCRIPTION

A lignin compound for use in this invention may be a lignin as it is produced during wood pulping in conjunction with paper manufacture. The source of the lignin is not essential to the invention. Lignin from hardwood or from softwood may be used. Lignin may also be from another biological source. The lignin may be a product of any kind of process applied in the paper pulp industry, whether it is a soda, sulfite, organosolv or Kraft process. The weight average molecular weight (Mw) of native lignin from softwood is not known but is estimated to be 20,000. The number average molecular weight (Mn) of soft wood Kraft lignin has been estimated as 1600. The number average molecular weight of hardwood Kraft lignin has been estimated as 1000-1300. The weight average molecular weight of soft wood Kraft lignin has been estimated as 2700-3500. The weight average molecular weight of hardwood Kraft lignin has been estimated as 2400-2900. Methods to obtain a higher molecular weight lignin fraction from Jack pine Kraft lignin is taught in U.S. Pat. No. 6,172,204.

The lignin compound may be a lignin as such, but preferably the lignin compound is a purified lignin. It is also preferred that the lignin compound is a derivatised lignin. Without wishing to be bound by theory, it is believed that purification and derivatisation improve the thermal stability of the lignin compound and, therefore improves the result of melt spinning the lignin compound to produce fibre.

Purification processes for lignin are known in the art. For example, lignin may be purified by precipitation from a basic solution and washing the precipitate with aqueous acid, as taught in US2008/0317661 A1, and US2008/0318043 A1. An alternative method is known from U.S. Pat. No. 6,172,204.

Derivatisation of lignin may be accomplished, for example by etherification or by acylation, forming lignin ethers or esters, respectively. Etherification may be achieved, as known from U.S. Pat. No. 6,172,204 by reaction with a dialkyl sulfate, such as dimethyl sulfate or diethyl sulfate, which, however, are reported to be carcinogenic materials. Acylation may be accomplished by reaction with a carboxylic acid, using the carboxylic acid itself, or an active form of the carboxylic acid. Acylation of lignin results in lignin carrying acyl groups bonded to its molecular structure, wherein the acyl groups are derived from the carboxylic acid. Suitable carboxylic acids may have up to 25 carbon atoms, preferably form 2 to 20 carbon atoms (inclusive). Preferably, the carboxylic acids are aliphatic acids having a straight chain of carbon atoms, more preferably a straight saturated chain of carbon atoms. Suitably, the carboxylic acids may be selected from, for example, acetic acid, propionic acid, butyric acid, oleic acid and stearic acid. Suitable active forms of the carboxylic acids are acid chlorides and anhydrides. A preferred method of derivatisation is by acetylation, forming an acetate, which acetate is sometimes referred to as lignol acetate. Such derivatisation is known in the art, for example from US2008/0317661 A1, and US2008/0318043 A1. Typically, the acyl groups, in particular the acetyl groups, comprise at least 10% w, preferably in the range of from 16 to 25% w, in particular in the range of from 18 to 22% w, relative to the weight of dry lignin compound, in particular lignol acetate. As used herein, "% w" means "% by weight". Typically, the acyl groups comprise at least 2.3 mmole/g, preferably in the range of from 3.5 to 6 mmole/g, in particular in the range of from 4 to 5 mmole/g, relative to the weight of dry lignin compound. As used herein, the weight or mole fraction of the acyl groups, in particular the acetyl groups, in the dry lignin compound, in particular lignol acetate, is as determined by the method known from US 2008/0317661 A1 and US 2008/0318043 A1.

The lignin compound for use in this invention may typically have a melting point in the range of from 110 to 300° C., preferably the melting point is in the range of from 125 to 250° C. As used herein, melting points are as determined by using differential scanning calorimetry determining the Single Melting Point at a heating rate of 10° C./minute. The number average molecular weight (Mn) of the lignin compound may typically be in the range of from 500 to 5000, preferably in the range of from 800 to 2000. The weight average molecular weight (Mw) of the lignin compound may typically be in the range of from 1500 to 50000, preferably in the range of from 2000 to 30000.

The lignin compound may be employed as the single fibre material. The fibre material may comprise a blend of the lignin compound and a second lignin compound. Alternatively, the fibre material may comprise a blend of the lignin compound and one or more polymers such as a polyolefin, for example polyethylene or polypropylene; a polyester, such as poly(ethylene terephthalate) or a poly(lactic acid); or another polymer know in the art. The blend may be a homogenous blend or a heterogeneous blend. The fibre comprised of the lignin compound and one or more other polymers may be a structured multicomponent fibre in which the lignin compound or a blend of the lignin compound and another polymer makes up one component of the multicomponent fibre and a polymer or polymers make up another component of the multicomponent fibre. The multicomponent fibre may be a side-by-side multicomponent fibre, a sheath-core multicomponent fibre, a matrix-fibril multicomponent fibre, or a multicomponent fibre having a pie structure. Preferably, the multicomponent fibre is a sheath-core multicomponent fibre. Preferably, the core may comprise the lignin compound and the sheath may comprise one or more polymers, preferably selected such that the melting point of the sheath is lower than the melting point of the core. Having the core comprising the lignin compound and the sheath comprising one or more polymers has the advantage that colour in the lignin may be hidden, in particular when a pigment is added to the polymer(s). Typically, the melting point of the sheath is in the range of from 5 to 80° C. lower than the melting point of the core. Preferably, this difference is in the range of from 10 to 50° C. The weight ratio of the sheath to the core may be selected in a wide range. Useful fabrics may result from applying a weight ratio of the sheath to the core in the range of from 10/90 to 90/10, preferably in the range of from 20/80 to 80/20, in particular in the range of from 25/75 to 75/25.

The fibre comprising the lignin compound may be a continuous fibre, or it may be a staple fibre. In staple fibre, the weight average length of the filaments may typically be in the range of from 5 to 80 mm, more typically in the range of from 10 to 60 mm, preferably 25 to 50 mm.

The fibres making up the web may include a mixture of fibres, for example a mixture of the fibres comprising a lignin compound and other fibres such as fibres comprising a polyolefin, such as polyethylene or polypropylene; a polyester such as poly(ethylene terephthalate) or a poly (lactic acid); or cotton. The fibres comprising the lignin compound and other fibres may comprise additives, such as stabilisers, pigments, and fillers, for example, titanium dioxide, rice hull ash, calcium carbonate, and clay. Pigments may be applied in a quantity in the range of from 0.1 to 2% w, or more, and preferably in the range of from 0.3 to 1% w, based on the weight of the fibre.

The web of fibre comprising the lignin compound may be made by any technique of forming the web from the fibre well known in the field of nonwoven fabrics, such as carding, spunbonding, wet laying, air laying, and meltblowing.

Methods of producing the fibre comprising the lignin compound are know in the art of making carbon fibres, such as from "Fabrication and Properties of Carbon Fibres", Xiaosong Huang, Materials 2009, 2, 2369-2404; "Lignin-based Carbon Fibres: Effect of Synthetic Polymer Blending on Fibre Properties", S. Kubo and J. F. Kadla, Journal of Polymers and the Environment, Vol. 13, No 2, April 2005; "Lignin-based polymer blends: analysis of intermolecular interactions in lignin-synthetic polymer blends", John F. Kadla, Satoshi Kubo, Composites: Part A (2004) 395-400; "Lignin-based Carbon Fibres for Composite Fibre Applications", Carbon 40 (2000) 2913-2920; F. S. Baker, N. C. Gallego, A. K. Naskar, and D. A. Baker, "Low-Cost Carbon Fibre", Oak Ridge National Laboratory, FY 2007 Progress Report; Frederick S. Baker, "Low Cost Carbon Fibre from Renewable Resources", Oak Ridge National Laboratory, May 20, 2009; US2008/0317661 A1; and US2008/0318043 A1.

Such methods may be applied in producing the fibre starting from one or more lignin compounds and, optionally, one or more polymers. In general, the starting materials are melted in an extruder and conveyed to a spin bank or spin beam assembly, which includes a spinneret plate and a distribution plate connected to the extruder for receiving the molten material stream. The molten material is extruded through the holes of the spinneret into one or more curtains of continuous filaments which are subsequently quenched in a curtain of cool air and then attenuated by a high velocity fluid, such as air. This process of extruding a molten material through the holes of a spinneret into one or more curtains of continuous filaments and subsequently quenching the continuous filaments in a curtain of cool air is generally referred to as meltspinning, cf. N. P. Cheremisinoff, "Condensed encyclopedia of polymer engineering terms", Butterworth-Heinemann, Woburn (MA) (2001), ISBN 0-7506-7210-2, page 169. Thus, in general, the fibres are typically attenuated meltspun fibres.

When a multicomponent fibre is produced, the materials are melted in separate extruders and conveyed to the spin bank or spin beam assembly connected to the extruders such that the molten material streams are received separately. For example, in the production a sheath-core multicomponent fibre a stream becomes the core stream and another stream becomes the sheath stream, and the spinneret is constructed such that the core stream forms the core of the fibre and the sheath stream forms the sheath of the fibre.

The fibre so produced may be used as such in forming the web, or the fibre may be cut into staple fibre prior to forming the web. When the fibre is cut into staple fibre, the staple fibre may be carded to form the web. As known in the art, the carding may typically be carried out on a machine which comprises opposed moving beds or surfaces of fine, angled, spaced apart teeth or wires to pull clumps of the staple fibres into the web.

It may be preferred to form the web from a continuous fibre, in which case it may be particularly preferred to form the web in line with the production of the continuous fibre. Forming the web in line with the production of the continuous fibre may be accomplished, for example, in a so-called spunbond process, or in a meltblowing process. Spunbond processes are known as, for example, the DOCAN system (DOCAN is a trademark), developed by Lurgi Kohle & Mineral-Oltechnik GmbH (Germany); the REICOFIL system (REICOFIL is a trademark), developed by Reifenhauser (Germany); and the LUTRAVIL system (LUTRAVIL is a trademark), developed by Carl Freudenberg Company (Germany) A preferred method for making a spunbond bicomponent fibre and fabric of this invention could employ a commercial scale REICOFIL—3 type production line (REICOFIL is a trademark) similar to the machines offered by the Reifenhauser Company Machinenfabrik in Troisdorf, Germany (see, for example, U.S. Pat. No. 5,162,074, U.S. Pat. No. 5,344,297, U.S. Pat. No. 5,466,410, and U.S. Pat. No. 5,814,349). The bicomponent fabric may employ a polyethylene or a polypropylene as the sheath. As an example, Dow 6850A linear low density polyethylene (melt index 30, density: 0.955) or Total polypropylene M3766 (melt flow rate approximately 22) may be used as the sheath polymer and the lignin compound may be used as the core. This is further illustrated in the Examples, hereinafter.

In general, in the spunbond process the molten lignin compound(s) and, optionally, one or more molten polymers is/are extruded into continuous filaments as described above, and then collected on a collection surface such as a moving wire or screen. The continuous filaments may be collected in a random arrangement, or in a specific pattern, such as a pattern of overlapping loops or a zigzag or sine-wave pattern. Such arrangements may be accomplished by applying specific movements of the collecting surface relative to the unit(s) in which the continuous fibre is produced, as described above. Preferably, the continuous filaments are collected in a random arrangement.

The diameter of the fibres comprising the lignin compound is not essential to the invention. Suitably, the diameter is in the range of from 0.001 to 0.05 mm, more suitably in the range of from 0.01 to 0.025 mm, for example 0.02 mm, which may be achieved by balancing various factors such as the melt through-put (grams/minute/hole), melt temperature, quench temperature, and air attenuation cabin pressure. The web, and after bonding the nonwoven fabric, of this invention may, for example, be made using a three beam spunbonding machine and therefore have a SSS (spunbond/spunbond/spunbond) type of structure. The web and the nonwoven fabric may have a basis weight in the range of from 2 to 70 g/m², in particular in the range of from 5 to 40 g/m², with fabrics in the range of from 10 to 20 g/m² preferred for many applications, in particular disposable diaper applications. The fibres in these preferred webs and nonwoven fabrics may have a fibre diameter in the range of from 0.01 to 0.025 mm. As used herein, basis weight is as measured by generally following ASTM D6242-98, as cutting out a defined number of sheets, for example 10 sheets, of a carefully defined shape, for example 10 cm by 10 cm rectangles, and weighing the sheets using an analytical balance. As used herein, fibre diameter is as measured by using a microscope having an internal ruler having a scale of length units. The measured fibre diameter and the density of the material used in the fibre spinning may be used to calculate the fibre denier, as commonly known by the skilled person.

After forming the web of fibre comprising the lignin compound, at least a portion of the fibre in the web is bonded to form the nonwoven fabric, preferably to form a nonwoven web having a coherent web structure. Such bonding may be accomplished by methods well known in the art, for example by thermal, chemical, hydroentangling, or mechanical bonding.

Thermal point bonding is the preferred bonding method. Thermal point bonds may impart abrasion resistance, strength and flexibility to the fabric. A preferred method of thermal bonding uses heated calender rolls of which one of the rolls is an embossed roll covered with a point bonding pattern made up of raised bosses which may be engraved on the surface on the roll. Any pattern known in the art may be used with typical embodiments employing continuous or discontinuous patterns. Preferably, the bonds cover from 2 to 50%, more preferably from 6 to 40% of the area of the web.

Not wishing to be bound by theory, it is believed that, in the case of a sheath-core multicomponent fibre, the optimum bond area depends on the polymer used as the sheath and the final application of the fabric. For abrasion resistance, a higher bond area may be preferred when the sheath comprises polyethylene, as compared to the case in which the sheath comprises polypropylene. For sheath-core bicomponent fibres having the lignin compound as the core and polyethylene as the sheath an embossed calender pattern may be used which bonds 15 to 35% of the surface of the non-woven fabric. For sheath-core bicomponent fibres having the lignin compound as the core and polypropylene as the sheath an embossed calender pattern may be used which bonds 8 to 30% of the surface of the non-woven fabric.

The calender temperature and fabric speed may be selected so as to bond the web at the maximum temperature possible without the web sticking to the calender surface. While the calender temperature is typically not directly measured, the temperature of the hot oil circulating within the embossing and smooth rolls of the calender may be significantly higher than the melting temperature of the sheath polymer. Thus, it may be desired to employ an embossed roll coated with an anti-stick formulation such as described in EP-A-1432860.

The application in this invention of multicomponent fibre comprising the lignin compound as the core and polymer as the sheath, such that the melting point of the sheath is lower than the melting point of the core, has the advantage that thermal damage to the lignin compound during the thermal point bonding process may be diminished or prevented.

In chemical bonding, a binder is used to chemically join fibres in the web, such binders may comprise, for example, acrylate polymers, styrene-butadiene copolymers and vinyl acetate copolymers. Water based systems may be used, such as in the form of an aqueous emulsion, but alternative systems may comprise powdered adhesives, foam or organic solvent solutions. The binder may be applied by impregnating, typically up to saturation, coating or spraying or intermittently, as in print bonding. Print bonding is used when specific patterns are desired and where it is necessary to have the majority of fibres free of binder for functional reasons. The chemically bonded nonwoven fabric may comprise of from 20 to 40% w binder resin and 60 to 80% w of fibre.

The nonwoven fabric of this invention may be produced as a flat structure. The nonwoven fabric of this invention is flexible, and porous.

The nonwoven fabric of this invention may be treated with a hydrophilic surface modifying agent such as NUWET 237 (a siloxane polymer available from Momentive Performance Materials, Albany, N.Y., USA; NUWET is a trademark). This treatment may be applied, in particular, when the nonwoven fabric will be applied in diaper topsheet fabric applications. Specifically, the surface-modifying agent may be added to water to form a diluted solution or emulsion, and may then be applied to the surface of the nonwoven fabric by using a kiss roll, after which the nonwoven fabric may be dried to remove the water. The quantity of hydrophilic surface modifying agent may typically be in the range of from 0.05 to 1% w, more typically in the range of from 0.1 to 0.6% w, based on the weight of the untreated nonwoven fabric.

This invention also provides a laminated fabric. The laminated fabric may be formed by laminating the nonwoven fabric of the invention to one or more plies. Such plies may be used in any suitable form, such as a meltblown web, a spunbond web, a web of staple fibres, or a film. Optionally, additional plies which may be the same or different from the nonwoven fabric of the invention or from the other plies may be added. The plies may be laminated by any of the methods known in the art.

For example, in the case that the nonwoven fabric of the invention is laminated to a fibrous ply, lamination may be achieved by known techniques, such as by hydroentangling, spot bonding, or through-air bonding. The term spot bonding includes both continuous and discontinuous bonding and combinations thereof. Preferably, the two fibrous plies are laminated together by passing through a heated patterned calender to form discrete thermal point bonds. It is also possible to achieve bonding though use of a bonding agent such as an adhesive.

Alternatively, a laminated fabric of this invention may be made by laminating a nonwoven fabric of this invention with a ply of a film of a thermoplastic polymer. The thermoplastic polymer may be a polyolefin, for example polyethylene or polypropylene, or a polyester, for example poly(lactic acid). A particularly preferred polymer may be linear low density polyethylene. The film has suitably a thickness in the range of from 0.015 to 0.03 mm, preferably in the range of from 0.02 to 0.025 mm, in particular when an application in baby diapers is envisaged. The thermoplastic polymer films include both breathable and non-breathable films, such as those known in the art. U.S. Pat. No. 5,865,926 teaches breathable films and methods for making such films.

Lamination of the nonwoven fabric of this invention to the film of a thermoplastic polymer may be achieved by adhesive lamination using a continuous or discontinuous layer of adhesive. Alternatively, the lamination may be achieved by thermo-lamination using calender rolls as described above, in which case the temperature and pressure are selected such that the barrier properties of the film are not compromised. Alternatively, a thermoplastic polymer film may be directly extruded onto the nonwoven fabric of this invention.

The nonwoven fabric and the laminated fabric of the invention may be used for making a nonwoven fabric product of this invention. The nonwoven fabric products of the invention include disposable and nondisposable products such as diapers, training pants, incontinence briefs, feminine hygiene products, medical barrier fabrics, protective clothing and dryer sheet. It is an achievement of this invention that the nonwoven fabric products have a higher sustainable content than comparable conventional products.

For example, the laminated fabric which comprise a nonwoven fabric of this invention laminated with a web of meltblown fibres, as described hereinbefore, has utility as a barrier material in medical applications, protective clothing, and for hygiene applications, such as leg cuffs and backsheets for diapers. Of particular interest for diaper applications are spunbond/meltblow/spunbond laminates (SMS) having a total basis weight in the range of from 8 to 15 g/m$^2$ for use as backsheet, leg cuff, dusting layer, and core wrap.

As further examples, the laminated fabric which comprises a nonwoven fabric of this invention laminated with a ply of a film of a thermoplastic polymer, in particular polyethylene, has utility as barrier leg cuffs and backsheets in diapers. When the nonwoven fabric has enough stretch and the film is sufficiently elastic, the laminate has utility as a diaper ear or pant diaper side-panel. Preferably, for this application the nonwoven fabric has sufficient stretch so that it may be permanently deformed when the laminated fabric is stretched using a suitable means, such as by ring rolling. After stretching the laminated fabric may provide stretch within the diaper thus improving diaper fit around the child so the diaper will not leak and the child's legs or waist will not be red-marked from diaper/skin contact.

Now turning to the Figures, FIG. 1 illustrates a nonwoven fabric 10 of this invention. In web 12 fibres comprised of the lignin compound are bonded by a plurality of intermittent bonds 14 to form the nonwoven fabric.

FIG. 2 depicts a multicomponent fibre 20 of this invention, having a core 22 and a surrounding sheath 24.

FIG. 3 illustrates a laminated fabric 30 of this invention. Ply 32 comprises a nonwoven fabric formed from fibres comprised of the lignin compound. A second ply 34 of the laminated fabric 30 may exist in various forms such as a meltblown web, a spunbond web, a web of staple fibres, or a film. Plies 32 and 34 may be laminated together by passing through a heated patterned calender to form discrete thermal point bonds indicated as 36.

FIG. 4 illustrates a laminated fabric 40 of this invention, which includes a ply 42 comprising a nonwoven fabric formed from fibres comprised of the lignin compound, laminated to a polyolefin film ply 44.

FIG. 5 illustrates a nonwoven fabric product 50 of this invention, in particular a diaper having a backsheet 52 and leg cuff components 54.

The invention will now be further illustrated by means of the following examples, of which Examples 1-14, 17 and 18, and portions of Examples 15 and 16 are calculated, conceptual examples.

EXAMPLE 1 (ACCORDING TO THE INVENTION)

A nonwoven fabric is prepared from lignin derived from the ALCELL process (ALCELL is a trademark), such as offered by the Lignol Energy Co. of Burnaby, BC, Canada and its affiliate, Lignol Innovations. The lignin is spun, formed into a web and calender bonded into a spunbond nonwoven fabric via use of a one meter wide REICOFIL 3 pilot line (REICOFIL is a trademark) based on the process offered by Reifenhauser Company Machinenfabrik in Troisdorf, Germany. The spinning conditions including the lignin throughput per spinneret hole, extrusion zone temperatures, melt temperature, die temperature, and air attenuation cabin pressure are varied to yield fibres having a diameter in the range of from 0.015 to 0.02 mm. The resulting fibres are collected on a wire moving at a speed balanced with the extrusion rate such that a web having a basis weight of about 22 g/m² is obtained. The web is conveyed to a calender comprising a smooth roll and a patterned roll (18% of the surface consists of raised bosses) and bonded into a nonwoven web. The bonding temperature and pressure of the bonding calender are matched with the line speed to yield a bonded spunbond nonwoven fabric having a basis weight of about 22 g/m² and optimized MD (machine direction) and CD (cross direction) tensile strength.

EXAMPLE 2 (ACCORDING TO THE INVENTION)

A nonwoven fabric is prepared from a blend of 20% w solvent-extracted Kraft hardwood lignin such as described in Example 1 with 80% w Kraft softwood lignin produced by the LignoBoost process, marketed by Innventia AB of Stockholm, Sweden. Such a lignin blend is reported to melt at 179° C. with softening starting at 159° C. Spunbond nonwoven fabrics are made using the equipment and process in Example 1 adjusted for the melting temperature for this specific lignin. The bonding temperature and pressure of the bonding calender is matched with the line speed to yield a bonded spunbond nonwoven fabric having a basis weight of 22 g/m² and optimized MD (machine direction) and CD (cross direction) tensile strength.

EXAMPLE 3 (ACCORDING TO THE INVENTION)

Fibres are prepared from a blend of 20% w solvent-extracted Kraft hardwood lignin such as made by the ALCELL process (ALCELL is a trademark), as offered by the Lignol Energy Co. of Bumaby, BC, Canada and its affiliate, Lignol Innovations and 80% w Kraft softwood lignin produced by the LignoBoost process, marketed by Innventia AB of Stockholm, Sweden. Such a lignin blend is reported to melt at 179° C. with softening starting at 159° C. During processing the fibre spinning speed and the draw force are controlled to yield $0.6667 \times 10^{-6}$ kg/m (6 denier) fibre. The resulting fibre is treated with a fibre finish comprising a lubricant, an antistat and an emulsifier, cut into 38 mm (1.5 inch) staple fibres; and then are carded into a web having a basis weight of 40 g/m². The web is saturated with a latex emulsion comprised of a styrene-butadiene rubber binder, such that after drying and curing the resulting carded resin bonded nonwoven is comprised of 30% w binder resin and 70% w of lignin fibre. The resulting nonwoven fabric is found to show stiffness and compression resistance such that it is useful as an acquisition distribution layer within a baby diaper.

This example demonstrates that damage to the fibre as it may occur during thermo bonding because of the high melting point of a lignin blend, such as used in Example 2, may be prevented by applying chemical bonding.

EXAMPLE 4 (ACCORDING TO THE INVENTION)

A nonwoven fabric is prepared from a bicomponent fibre comprising lignin derived from the ALCELL process (ALCELL is a trademark) as the core and linear low density polyethylene (LLDPE) as the sheath. The nonwoven fabric of this example results from using the REICOFIL 3 pilot line of Example 1 modified to spin bicomponent fibres (REICOFIL is a trademark). Such modifications are offered by Reifenhauser Company Machinenfabrik in Troisdorf, Germany. Lignin derived from the ALCELL process (ALCELL is a trademark) such as being offered by the Lignol Energy Co of Bumaby, BC, Canada and its affiliate, Lignol Innovations, is melted in extruder 1. Dow 6850A LLDPE (melt index 30, density=0.955, melt temperature of approximately 133° C.) is melted in extruder 2. Up to 1% by weight titanium dioxide for whitening is blended into the molten LLDPE. The molten materials from Extruder 1 and 2 are conveyed to the spin bank or spin beam assembly, which includes a spinneret plate and a distribution plate, connected to the extruders for separately receiving the molten material streams such that the molten lignin stream becomes the core stream and the molten LLDPE stream becomes the sheath stream. The throughputs of extruders 1 and 2 are adjusted such that the sheath/core ratio is 30% w LLDPE and 70% w lignin. The process variables as described in Example 1 are adjusted to yield a bonded spunbond nonwoven fabric have a basis weight of 22 g/m² and an optimum balance of tensile strength and elongation.

EXAMPLE 5 (ACCORDING TO THE INVENTION)

Example 4 is repeated with the difference that the throughputs of extruders 1 and 2 are adjusted such that the sheath/core ratio is 50% w LLDPE and 50% w lignin, instead of 30% w LLDPE and 70% w lignin.

A nonwoven fabric having a basis weight of 22 g/m² is obtained.

EXAMPLE 6 (ACCORDING TO THE INVENTION)

Example 4 is repeated with the difference that the throughputs of extruders 1 and 2 are adjusted such that the sheath/core ratio is 60% w LLDPE and 40% w lignin, instead of 30% w LLDPE and 70% w lignin.

A nonwoven fabric having a basis weight of 22 g/m² is obtained.

EXAMPLE 7 (ACCORDING TO THE INVENTION)

A derivatised lignin is prepared by using the method known from US2008/0317661 A1 and US2008/0318043 A1. Accordingly, a purified lignin is prepared by precipitating and washing lignin from softwood Kraft black liquor, and reacting the purified lignin with acetic anhydride in the presences of a pyridine catalyst. The resulting lignol acetate is precipitated, washed and dried. The resulting washed and dried lignol acetate comprises 21% w acetyl groups relative to the weight of the dried lignol acetate.

Then Example 4 is repeated with the differences that
the resulting washed and dried acetylated softwood lignin (lignol acetate) is used, instead of the lignin derived from the ALCELL process (ALCELL is a trademark), and
a calender pattern having about 25% bond area is used, instead of a calender pattern having about 18% bond area, and the line speed is adjusted so that a nonwoven fabric having a basis weight of 15 g/m² is obtained.

EXAMPLE 8 (ACCORDING TO THE INVENTION)

Example 7 is repeated with the difference that the throughputs of extruders 1 and 2 are adjusted such that the sheath/core ratio is 50% w LLDPE and 50% w lignol acetate, instead of 30% w LLDPE and 70% w lignol acetate.

A nonwoven fabric having a basis weight of 15 g/m² is obtained.

EXAMPLE 9 (ACCORDING TO THE INVENTION)

Example 7 is repeated with the difference that the throughputs of extruders 1 and 2 are adjusted such that the sheath/core ratio is 60% w LLDPE and 40% w lignol acetate, instead of 30% w LLDPE and 70% w lignol acetate.

A nonwoven fabric having a basis weight of 15 g/m² is obtained.

EXAMPLE 10 (ACCORDING TO THE INVENTION)

Example 7 is repeated with the differences that Total metallocene polypropylene M3766 (melt flow rate approximately 22 is used, instead of LLDPE and that the melt temperature is about 167° C.

A nonwoven fabric having a sheath/core ratio of 30% w PP and 70% w lignol acetate, instead of 30% w LLDPE and 70% w lignol acetate, with a basis weight of 15 g/m² is obtained.

EXAMPLE 11 (ACCORDING TO THE INVENTION)

Example 10 is repeated with the difference that the throughputs of extruders 1 and 2 are adjusted such that the sheath/core ratio is 50% w PP and 50% w lignol acetate, instead of 30% w PP and 70% w lignol acetate.

A nonwoven fabric having a basis weight of 15 g/m² is obtained.

EXAMPLE 12 (ACCORDING TO THE INVENTION)

Example 10 is repeated with the difference that the throughputs of extruders 1 and 2 are adjusted such that the sheath/core ratio is 60% w PP and 40% w lignol acetate, instead of 30% w PP and 70% w lignol acetate.

A nonwoven fabric having a basis weight of 15 g/m² is obtained.

EXAMPLE 13 (ACCORDING TO THE INVENTION)

A laminated fabric is made by adhesively bonding the nonwoven fabric of Example 11 to a breathable polyethylene film by carrying out the steps of applying a discontinuous spray of adhesive to the nonwoven fabric, contacting the adhesive side of the nonwoven fabric to an unwinding web of breathable film, nipping the film and nonwoven fabric together, and winding the resulting laminated fabric into a roll.

EXAMPLE 14 (ACCORDING TO THE INVENTION)

A diaper is made by carrying out the steps of forming a diaper as known in the art of diaper making, except that in the backsheet forming step the nonwoven fabric of Example 11 is used instead of a known nonwoven fabric, typically a 100% polypropylene spunbond nonwoven fabric having a basis weight of 15 g/m². Typically, the known steps of forming a diaper include, as part of an inline backsheet making step, a step of laminating the nonwoven fabric to a breathable film. In this example 14, the inline backsheet making step is similar to the process described in Example 13.

EXAMPLE 15 (ACCORDING TO THE INVENTION)

Kraft Softwood Lignin purified by the LignoBoost process (offered by Innventia, Stockholm, Sweden) was received from Kurger-Wayagamack of Canada. This lignin was compounded with high-density polyethylene (HDPE) (Dow Aspun 6834) to yield masterbatches containing 10% w and 20% w lignin. The master batches were blended with neat HDPE (Dow Aspun 6834) in ratios to yield 5% Lignin in 95% HDPE and spun into fibres using a small pilot line equipped with a slot type air attenuation system. This pilot line had a spin plate with 164 0.4 mm diameter holes. The extruder zone temperatures were set at approximately 160° C. (Zone 1), 170° C. (Zone 2), 180° C. (Zone 3), 190° C. (Zone 4 and 5). The melt temperature and die temperature was set at approximately 190° C. The quench temperature was set at approximately 25° C. The gap in the air attenuation slot was set at approximately 15 mm. Fibres were obtained. During the spinning trial fumes with a strong smell of burning wood was noted. Some fibre breaks were noted directly below the spinning plate.

The fibres obtained are cut into pieces having a length of a few centimeters. The pieces of fibres are mixed together and smoothed into a web, simulating a web which may be obtained from a carding process. An adhesive is applied to the web. After drying and curing the adhesive, a nonwoven fabric is obtained.

EXAMPLE 16

A derivatised lignin was prepared by using the method generally known from US2008/0317661 A1 and US2008/0318043 A1. Accordingly, Kraft Softwood Lignin, INDULIN AT, obtained from MeadWestvaco, North Charleston, S.C., USA 29406-3615, was reacted with acetic anhydride. The FTIR spectrum of the lignol acetate so obtained showed a strong peak centered at approximately 1750 cm$^{-1}$, corresponding to acetyl groups that have largely capped (reacted with) the original free phenol and alcoholic hydroxy groups on lignin, which hydroxy groups are reported to show a very strong broad peak centered at 3419 cm$^{-1}$. The reacted lignin showed a broad melting point between 180° C. and 200° C. This melting behavior is in contrast to the sharp melting point at 220° C. reported in US2008/0317661 A1, and may suggest an incomplete conversion to lignol acetate.

The lignol acetate obtained was compounded with high-density polyethylene (HDPE) (Dow Aspun 6834) to yield a masterbatch containing 10% w lignol acetate, 0.2% w of an antioxidant blend, and 89.8% w HDPE. A strong odour suggestive of vinegar was noted during the masterbatch process.

The masterbatch of HDPE and lignol acetate was blended with neat HDPE (Dow Aspun 6834) in a ratio of 50 parts masterbatch and 50 parts HDPE to yield a blend comprising 2.5% w lignol acetate in polyethylene.

This blend was spun into fibres using a small pilot line equipped with a slot type air attenuation system. This pilot line had a spin plate with 164 0.4 mm diameter holes. The extruder zone temperatures were set at approximately 170° C. (Zone 1), 180° C. (Zone 2), 190° C. (Zone 3), 200° C. (Zone 4 and 5). The melt temperature and die temperature was set at approximately 200° C. The quench temperature was set at approximately 20° C. The gap in the air attenuation slot was set at approximately 20 mm. Fibres were obtained but a significant number of fibre breaks below the spinning plate was observed. During the spinning trial fumes with a strong smell of burning wood, vinegar, and a third odour were noted.

The fibres obtained are cut into pieces having a length of a few centimeters. The pieces of fibres are mixed together and smoothed into a web, simulating a web which may be obtained from a carding process. An adhesive is applied to the web. After drying and curing the adhesive, a nonwoven fabric is obtained.

A polyolefin film is treated with a contact adhesive and is then laid on top of the nonwoven fabric obtained. A weight is rolled over the top of the adhesive treated film to promote formation of an adhesive bond between the film and the nonwoven fabric. After drying and curing the adhesive, a laminated fabric comprising the film adhesively fastened to the nonwoven fabric is obtained.

The nonwoven fabric laminated to the outer side of the backsheet film of a small diaper, Pampers Swaddlers New Baby Size 2, is carefully removed. Contact adhesive is then applied to the outer side of the film backsheet of the Swaddlers diaper. The nonwoven fabric comprising lignol acetate fibres, obtained as described above in this Example 16, is laid on top of the adhesive coating applied to the outer side of the film backsheet of the the Swaddler diaper. A weight is rolled over the top of the resulting construction to yield a diaper.

EXAMPLE 17 (ACCORDING TO THE INVENTION)

A derivatised lignin is prepared by using the method known from US2008/0317661 A1 and US2008/0318043 A1. Accordingly, a purified lignin is prepared by precipitating and washing lignin from softwood Kraft black liquor, and reacting the purified lignin with acetic anhydride in the presences of a pyridine catalyst. The resulting lignol acetate is precipitated, washed and dried. The resulting washed and dried lignol acetate comprises 21% w acetyl groups relative to the weight of the dried lignol acetate. This lignol acetate is compounded with high-density polyethylene (HDPE) (Dow Aspun 6834) to obtained a masterbatch containing 20% w of the acetylated lignin, 0.2% w antioxidant blend, and 79.8 w % HDPE.

Then Example 4 is repeated with the differences that
the masterbatch so obtained is used, instead of the lignin derived from the ALCELL process (ALCELL is a trademark), and
a calender pattern having about 25% bond area is used, instead of a calender pattern having about 18% bond area, and the line speed is adjusted so that a nonwoven fabric having a basis weight of 15 g/m² is obtained.

EXAMPLE 18 (ACCORDING TO THE INVENTION)

Example 17 is repeated with the difference that the throughputs of extruders 1 and 2 are adjusted such that the sheath/core ratio is 50% w LLDPE and 50% w of the masterbatch, instead of 30% w LLDPE and 70% w of the masterbatch.

A nonwoven fabric having a basis weight of 15 g/m² is obtained.

The invention claimed is:
1. A nonwoven fabric, which nonwoven fabric comprises a meltspun fibre comprising a lignin compound.
2. A nonwoven fabric as claimed in claim 1, wherein the lignin compound comprises a derivatised lignin.
3. A nonwoven fabric as claimed in claim 2, wherein the derivatised lignin is an acylated lignin carrying acyl groups bonded to its molecular structure.
4. A nonwoven fabric as claimed in claim 1, wherein the fibre is made of a fibre material comprising a blend of the lignin compound and another lignin compound, or one or more polymers.
5. A nonwoven fabric as claimed in claim 1, wherein the fibre comprises a multicomponent fibre comprising a lignin compound and a polymer or comprising two or more lignin compounds.
6. A nonwoven fabric as claimed in claim 1, wherein the fibre comprises additives, such as stabilisers, pigments, and/or fillers.
7. A nonwoven fabric as claimed in claim 1, wherein the fibre has a diameter in the range of from 0.001 to 0.05 mm.
8. A nonwoven fabric as claimed in claim 1, wherein the fibre is an attenuated meltspun fibre.
9. A laminated fabric comprising a nonwoven fabric as claimed in claim 1.
10. A laminated fabric comprising a nonwoven fabric as claimed in claim 9, which laminated fabric comprises a ply of a nonwoven fabric comprised of a meltspun fibre comprising a lignin compound, and laminated thereto one or more plies in the form of a meltblown web, a spunbond web, a web of staple fibres, or a film.
11. A nonwoven fabric product comprising a nonwoven fabric as claimed in claim 1.
12. A nonwoven fabric product as claimed in claim 11, wherein the nonwoven fabric product is selected from diapers, training pants, incontinence briefs, feminine hygiene products, medical barrier fabrics, protective clothing and dryer sheet.
13. A multicomponent fibre, which multicomponent fibre is a structured multicomponent fibre comprising a lignin compound and a polymer or comprises two or more lignin compounds.
14. A multicomponent fibre as claimed in claim 13, wherein the structured multicomponent fibre is a sheath-core multicomponent fibre, of which the core comprises the lignin compound or a blend of the lignin compound and another polymer and the sheath comprises one or more polymers, wherein the melting point of the sheath is lower than the melting point of the core.
15. A web, which web comprises a meltspun fibre comprising a lignin compound.
16. A method of producing a nonwoven fabric, which method comprises forming a web of meltspun fibre comprising a lignin compound and bonding at least a portion of the fibre in the web to form the nonwoven fabric.
17. A method of producing a nonwoven fabric as claimed in claim 16, wherein the method comprises a spunbond process.
18. A method of producing a nonwoven fabric as claimed in claim 16, further comprising the steps of:
  forming a melt stream comprising the lignin compound;
  extruding the melt stream through a spinneret to form a plurality of molten or semi-molten filaments;
  quenching and attenuating the molten or semi-molten filaments;
  collecting the filaments on a collection surface; and
  bonding the filaments to each other to form a coherent nonwoven web.

19. A nonwoven fabric as claimed in claim 1, wherein the fibres comprising the lignin compound are bicomponent fibres having a sheath component comprising a polyolefin polymer, and a core component comprising the lignin compound.

20. The nonwoven fabric of claim 19, wherein the polyolefin polymer comprises a polypropylene or polyethylene.

* * * * *